Figure 1:
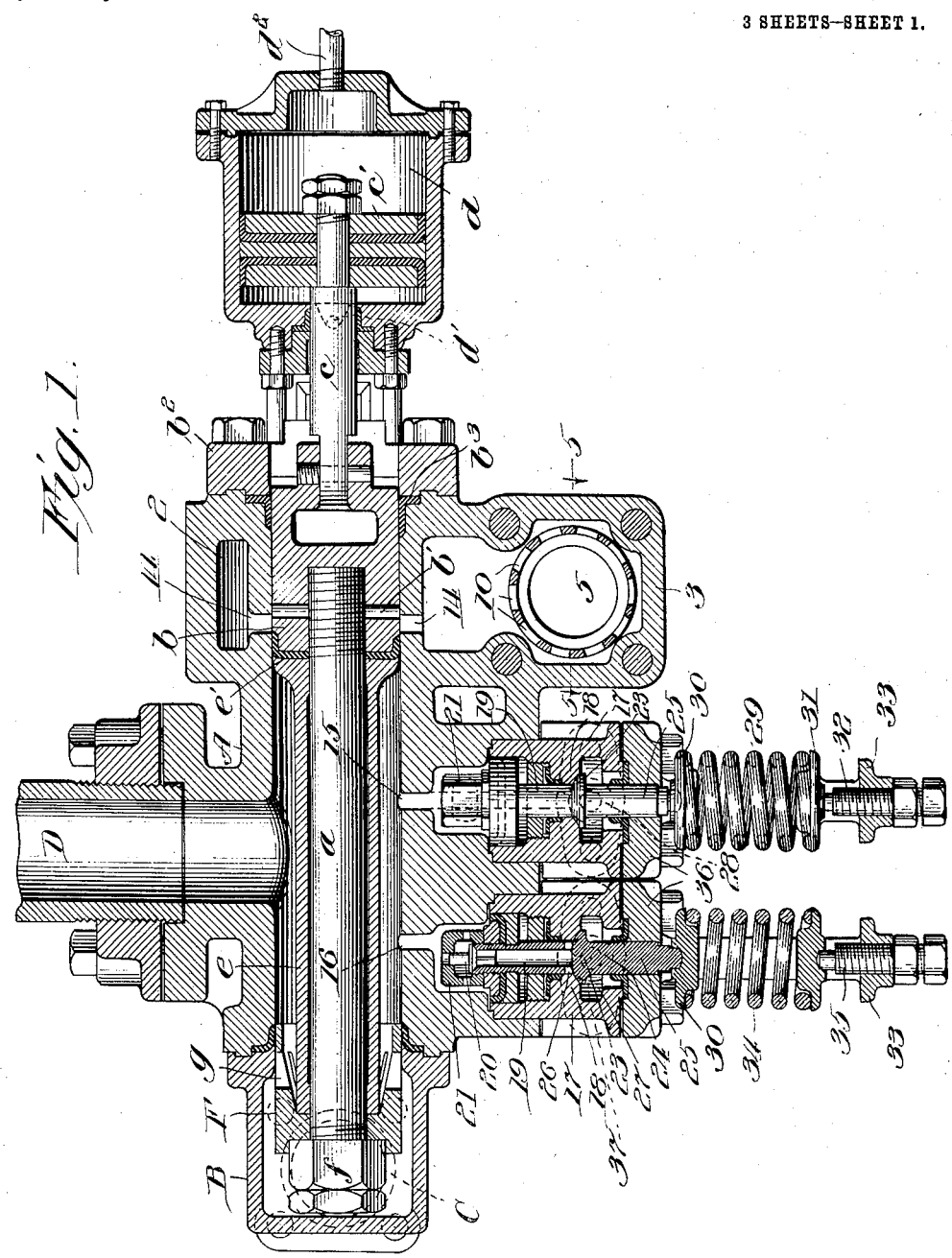

W. P. BETTENDORF, DEC'D.
J. W. BETTENDORF, ADMINISTRATOR.
AUTOMATIC PRESSURE CONTROLLING VALVE FOR HYDRAULIC PRESSES.
APPLICATION FILED JAN. 3, 1910.

1,046,949.

Patented Dec. 10, 1912.

3 SHEETS—SHEET 1.

Witnesses:
Harry S. Gaither
E. H. Lundy

Inventor:
William P. Bettendorf
by Frank D. Thomason
atty

W. P. BETTENDORF, DEC'D.
J. W. BETTENDORF, ADMINISTRATOR.
AUTOMATIC PRESSURE CONTROLLING VALVE FOR HYDRAULIC PRESSES.
APPLICATION FILED JAN. 3, 1910.
1,046,949.
Patented Dec. 10, 1912.
3 SHEETS—SHEET 2.
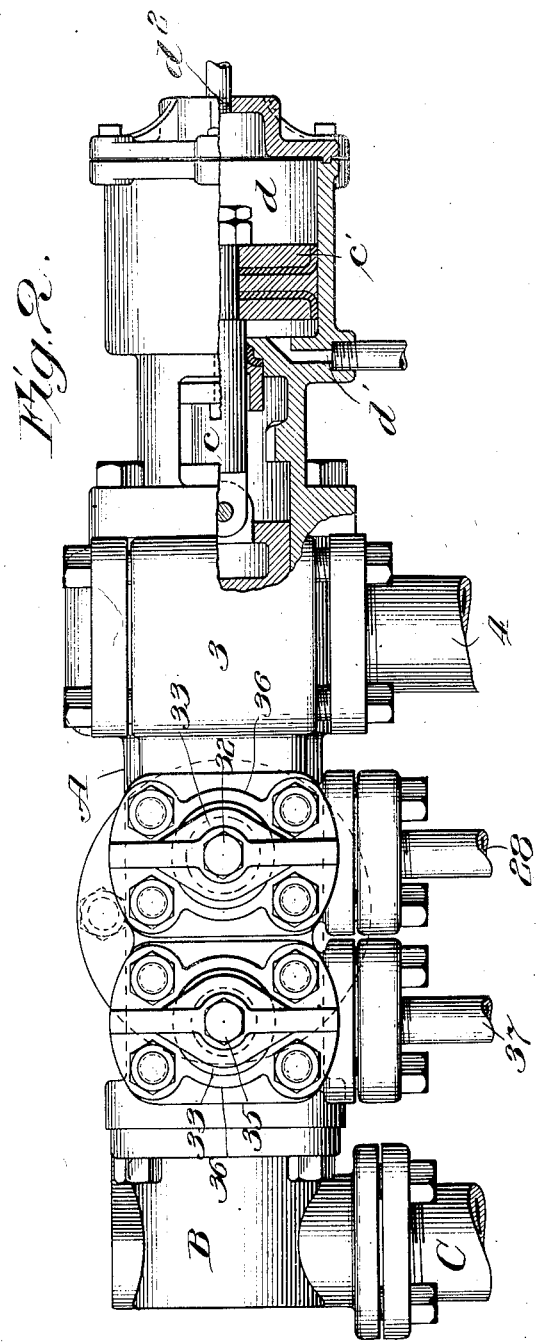
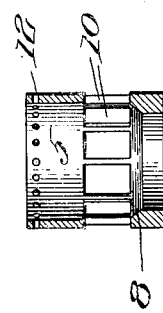
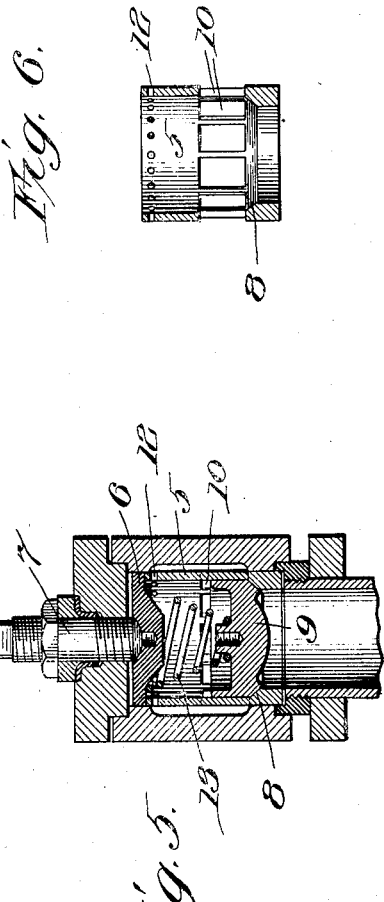
Witnesses:
Harry S. Gaither
E. K. Lundy
Inventor:
William P. Bettendorf
by Frank D. Thomason
atty

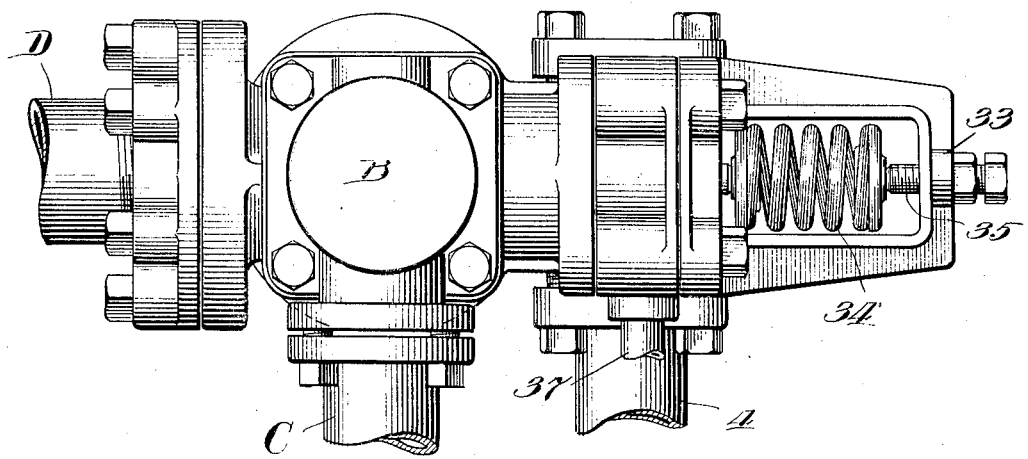
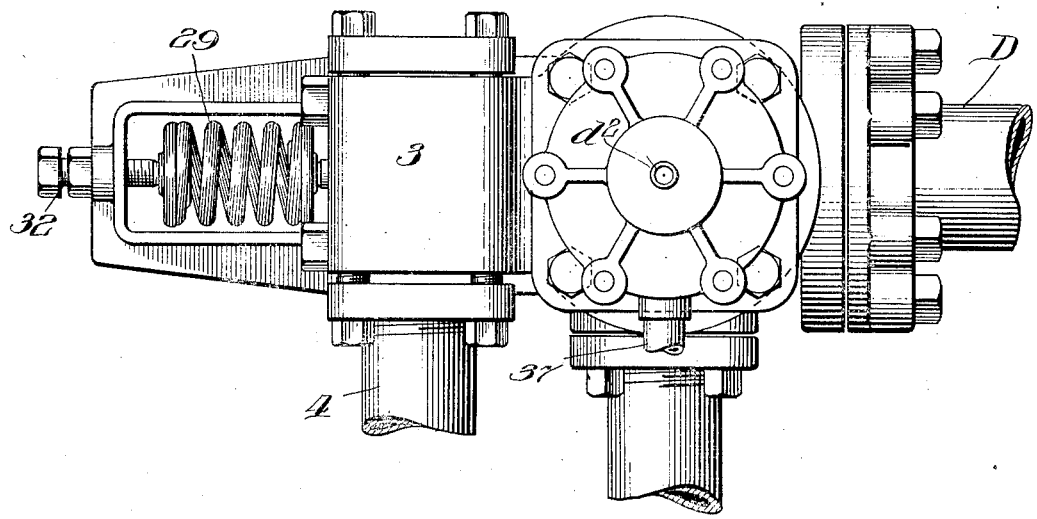

UNITED STATES PATENT OFFICE.

WILLIAM P. BETTENDORF, OF BETTENDORF, IOWA; J. W. BETTENDORF ADMINISTRATOR OF SAID WILLIAM P. BETTENDORF, DECEASED.

AUTOMATIC PRESSURE-CONTROLLING VALVE FOR HYDRAULIC PRESSES.

1,046,949.          Specification of Letters Patent.      Patented Dec. 10, 1912.

Application filed January 3, 1910. Serial No. 536,043.

*To all whom it may concern:*

Be it known that I, WILLIAM P. BETTENDORF, a citizen of the United States, residing at Bettendorf, in the county of Scott and State of Iowa, have invented new and useful Improvements in Automatic Pressure-Controlling Valves for Hydraulic Presses, of which the following is a full, clear, and exact description.

My invention relates to automatic pressure controlling valves for hydraulic presses, and particularly for large hydraulic presses employed to shape, shear and punch commercial forms of iron or steel, in which a pressure of two thousand five hundred tons to the square inch is sometimes developed. The principal considerations for presses of this kind are, first the pressure to be exerted by the ram, and, second, the extent of its travel, and heretofore the size or proportions of the ram and its cylinder depended upon these considerations. That is to say, if it was desired to exert a working pressure of 1500 tons, with a service water pressure of 350 pounds to the square inch in the simple type of hydraulic presses, the cylinder and ram would necessarily have to be over eight feet in diameter. This same working pressure of 1500 could be obtained with a service water pressure of 1000 pounds per square inch, with a ram of five feet in diameter, and with a service pressure of 3000 pounds per square inch with a ram three feet in diameter. An eight foot ram is physically impracticable, and the tremendous pressure of three thousand pounds per square inch is prohibitively expensive.

The object of my invention is to enable the comparatively small ram, while traveling to or from the work to be actuated by a very low service pressure, and then when the high pressure is needed, to automatically increase the intensity of the service pressure one, two, or more stages successively as needed. This I accomplish by comparatively simple means, and at a very small expenditure of liquid, substantially as hereinafter fully described, and as particularly pointed out in the claims.

In the drawings:—Figure 1 is a longitudinal horizontal central section of a hydraulic pressure controlling valve embodying my invention. Fig. 2 is a side elevation of the same. Figs. 3 and 4 are views, showing, respectively, end elevations of said valve. Fig. 5 is a section taken on dotted line 5, 5, of the inlet valve of the low service pressure pipe. Fig. 6 is a detail view showing the valve seat therein in longitudinal central section.

My improved valve is suitably attached to and located between the press and the source of liquid supply, to which latter it is connected by three distinct and independent water pipes or service lines. One of these pipes constitutes the low pressure line, supplying water at, say, 350 pounds to the square inch; the next supplies the water at a pressure of 1000 pounds to the square inch, and the third supplies pressure at 3000 pounds.

The valve, as shown in the drawings, comprises a suitable casing, the principal part of which consists of a longitudinally disposed cylindrical body, A, in which the sliding-valve for the press has reciprocal play. At one end of this body means are provided for moving the sliding-valve; at the opposite end, a suitable head B with the exhaust-pipe, C, leading therefrom is connected thereto, at about its center of length the feed-pipe D is suitably secured thereto and extends laterally therefrom, in a plane preferably, at right angles to pipe C, and diametrically opposite the said feed-pipe, and three service lines have valve-controlled connection with said body.

The sliding valve comprises a core $a$ consisting of a bolt threaded at both ends, and the end thereof opposite the exhaust-pipe C is tapped centrally into a head-block, $b$, from which it is prevented from accidentally unscrewing by a transverse pin $b'$ passing through both parts. This block fits snugly in the adjacent end of the bore of body A, and the sliding engagement thereof is made watertight by an annular plate $b^2$, surrounding the mouth of the bore and compressing a suitable packing ring $b^3$ into place. The outer end of block $b$ has the end of an alining piston $c$ suitably secured therein, and the opposite end of said piston enters a short cylinder $d$, and is provided therein with a suitable head $c'$. Cylinder $d$ is attached to and held out from the adjacent end of the cylindrical body of the casing by a suitable arrangement of bolts, and when compressed air or water under pressure is allowed to enter the same through port $d'$ back of the piston-head and exhausts through port $d^2$, the valve will move toward said cylinder and open the low pressure service-pipe and vice versa. The core-bolt of the valve is of such length that, when the low pressure service-pipe is closed, it extends to the opposite end of the exhaust-head of the casing, and, between block $b$ and the exhaust-head, it is surrounded by sleeve $e$ of less diameter than the bore of the body, except the end thereof next said block, which is expanded, and a suitable packing ring $e'$ is interposed between it and said block. This sleeve is held in place by lock-nuts $f$, between which and the adjacent end of the sleeve, a cup-shaped valve-head F surrounds and is secured by said nuts on the bolt-core. The diameter of this valve-head is such that it has a snug sliding engagement with the bore of the body A, but the interior dimensions of the exhaust pipe head are greater and leave an annular space around the valve-head. The skirt of the valve-head extends back over and surrounds the adjacent end of the sleeve $e$, and the inner surface of its skirt portion is of such diameter that there is room for the water to enter between the same and the core, and when the valve is at the end of its movement toward the exhaust pipe, flow radially out through slots $g$ made in said skirt into the exhaust-head and from thence out of exhaust-pipe. When the valve moves to the limit of its movement away from the exhaust-pipe these slots $g$ are closed and the discharge of the water stopped.

The end body A next cylinder $d$ has an annular chamber 2 cast integral therewith, and on the side of said body opposite the feed-pipe, it is built out to form a rectangular housing 3 for the valve controlling the supply of water from the low pressure service-pipe. This low pressure service-pipe 4 enters the lower end of said housing and both the lower end thereof surrounding said pipe and the upper open end of the same are closed by suitable plates clamped together by bolts and made watertight by suitable packing. Within housing 3 immediately above the end of the service pipe 4, a combined valve-seat and cage 5 is secured. This cage, as shown in Fig. 5 of the drawings, is cylindrical and of a length but little less in height than the housing, in which it is held in place by the downward pressure upon its upper end of a plate 6. A screw 7 is tapped through the top-plate of the housing and bears down upon plate 6. The lower end of cage 5 is made thicker and is provided with an inner beveled valve-seat 8, for the puppet-valve 9, and above the plane of this seat said cage is provided with a circumferential series of longitudinally elongated slots 10, which are adapted to communicate with a widened interior portion of the housing, and near its upper end it is provided with a circumferentially arranged series of perforations 12. The puppet-valve is normally kept seated by an inverted helical coil-spring 13, the ends of which are centered by suitable protuberances on the opposing faces of said valve and plate 6.

Now when the sliding-valve has been moved toward cylinder $d$ sufficiently to close the outlet slots $g$ in the valve-head F, block $b$ will have uncovered the ports 14, 14, connecting the annular chamber 2 with the interior of the sliding valve chamber of the case, and the low pressure water, say at 350 pounds pressure to the square inch, will flow around sleeve $e$ and into the feed-pipe D leading to the press, and will continue to move the ram thereof until the resistance thereto equals the working force created by the pressure of the water. When this point is reached the water, which will have filled the inlet ports 15 and 16 of the intermediate pressure service-lines and the high pressure lines, will automatically operate the valve mechanism of the intermediate service-line, and after its pressure of say 1,000 pounds to the square inch has been expended in operating the ram, will automatically operate the valve mechanism of the high pressure service line, and open it.

The construction of the valve-mechanism controlling the inlet of water from both the intermediate pressure service-line and the high pressure service-line is the same, so the description of the one will serve as a description for both.

The inlet-ports 15 and 16, are increased in diameter a short distance from the cylindrical body A in metal bosses integral with the same, and the openings of which said ports are a part, are stepped to a greater diameter to receive stubs 17 forming the casing for said valve-mechanism. The end portions of the bore of said stubs 17, are greater in diameter than the intermediate portion 18, which latter is just large enough to form a guide for a hollow piston 19. The end of this hollow-piston nearest body A, has a small puppet-valve 20, which is confined by a hood 21 that has lateral perforations in its sides that connect the hollow chamber therein in which said valve has a limited play with the port. Between said hood and the contracted portion 18 of the stub, a suitable piston-head surrounds and is secured to said piston 19, which engages the walls of the widened portion of the adjacent end of the bore of said stub. The mouth of the contracted portion of the bore of said stub farthest from the body A, is counter-sunk, and forms a seat for the correspondingly shaped head 23 of the valve 24, the spindle 25 of which extends in alinement with the hollow-piston 19, out through a packed opening in the plate 36 closing the outer end of the bore of the stub. The end of the said hollow piston farthest from said body is provided with lateral notches or openings, 26, and said end normally bears against the head 23 of the valve 24, and when the pressure of the water in the body (as, for instance, when the resistance to the water pressure from the low service pipe, is greater than said pressure) is sufficient to move the hollow piston, 19, outward, the valve 24 moves outward until the notches 26 can communicate with the inlet chamber 27 made by the widened bore of the outer end portion of the stub. The pipe 28 of the intermediate pressure service line is suitably connected to and leads from chamber 27, and when the bore of the hollow-piston 19, communicates through notches 26, with said chamber the intermediate pressure water flows through the hollow piston, lifts puppet-valve 20, and flows out through the perforations of hood 21, into the valve casing through port 15.

The resistance to the movement of the hollow-piston which determines what the amount of outward pressure in the body A of the casing shall be before said hollow-piston moves outward is determined by the difference in area of the outer exposed surface, and the under exposed surface of the truncated head 23 of valve 24. The water from the pipe of the intermediate pressure service line, 28, continually exerts a pressure of 1000 pounds to the square inch, against the underside of the valve-head 23, used in connection therewith, and the water from the pipe of the high pressure service-line 37 continually exerts a pressure of 3000 pounds to the square inch against the underside of the valve 23 used in conjunction therewith. Now the area of the outer exposed surface of the hood 21, in the port 15 of the intermediate pressure service-line, is enough greater than the exposed surface of the underside of the valve-head 23 of the coacting-valve 24, that, when the press ram ceases to move under the influence of the 350 pounds pressure of water from the low pressure service-line, said pressure will automatically overcome the 1000 pounds pressure from the intermediate pressure service line, and depress valve 24, and permit the water at 1000 pounds pressure to enter the valve-chamber in body A. So, likewise, when the press-ram ceases to move under the influence of the pressure supplied from the intermediate pressure service line, the area of the hood 21 in the port 16 of the high pressure service line, being greater than the underside of the valve-head 23 of valve 24, coöperating therewith, the 1000 pounds water pressure to the square inch within the valve-chamber of body A, overcomes the 3000 pounds square inch pressure under said valve-head and opens the passage of water to said body A, from the high pressure service line.

When the valve 24 is moved outward by the water pressure within the valve chamber its movement is resisted by a coil expansion spring 29, the ends of which are seated in suitably shaped caps. One of these caps, 30, is engaged by the outer end of the spindle 25 of valve 24, and the other, 31, of which is engaged by a set-screw or bolt 32 which is tapped through the central boss of a yoke 33, in alinement with the axis of said spring, said valve 24, and said hollow-piston 19. By manipulating said bolt 32, the proper cushioning of the valve 24 to automatically reseat the same when the pressure is cut off, can be obtained to a nicety.

The valve-mechanism for controlling the opening of the high-pressure service line, 37, is, as hereinbefore stated, the same as that just described.

The ends of the yokes, 33, are connected to or made integral with the plate 36, closing the outer ends of the bores of the valve stubs 17, but the construction of this element, as well as that of other parts of my invention may be changed if desired, so long as such departure does not affect the operation of my invention.

What I claim as new is:—

1. An automatic pressure controlling valve comprising a single longitudinally reciprocable valve, and casing therefor having a main chamber within which said valve reciprocates, an exhaust pipe leading from said chamber and adapted to be opened and closed by said valve, an open feed pipe leading from said chamber, and a series of separate pressure service pipes that discharge directly into said chamber, and separate valves for said pipes that are adapted to be automatically opened successively by the pressure of the preceding pressure service pipe.

2. An automatic pressure controlling valve comprising a valve and casing therefor having a main chamber within which said valve reciprocates, an exhaust pipe leading from said chamber and adapted to be opened and closed by said valve, an open feed pipe leading from said chamber, and a series of service pipes of varying pressures that discharge directly into the chamber, the port of the low pressure service pipe only being opened and closed by said valve.

3. An automatic pressure controlling valve comprising a valve and casing therefor having a main chamber within which said valve reciprocates, an exhaust pipe leading from said chamber and adapted to be opened and closed by said valve, an open feed-pipe leading from the said chamber, and a series of pressure service pipes of varying pressures that discharge directly into said chamber, a port of but one of said service pipes being closed when said exhaust pipe is being opened, and the ports of all of said service pipes adapted to be opened successively when said exhaust pipe is closed.

4. An automatic pressure controlling valve comprising a valve and casing therefor having a main chamber within which said valve reciprocates, an exhaust pipe leading from said chamber and adapted to be opened and closed by said valve, an open feed pipe leading from said chamber, a series of service pipes of varying pressures that discharge directly into said chamber and are adapted to be opened successively to the same commencing with the low pressure service pipe, the port of but one of said service pipes being closed when said exhaust pipe is opened and the ports of all of said service pipes adapted to be opened when said exhaust pipe is closed.

5. An automatic pressure controlling valve comprising a single longitudinally reciprocable valve and a casing therefor having a main chamber within which said valve reciprocates, an exhaust pipe leading from said chamber and adapted to be opened and closed by said valve, an open feed pipe leading from said chamber, and a series of separate pressure service pipes adapted to discharge directly into said chamber, and separate valves for said pipes that are automatically opened successively by the pressure from the preceding pressure service pipe.

6. An automatic pressure controlling valve comprising a valve and a casing therefor having a main chamber within which said valve reciprocates, an exhaust pipe leading from said chamber and adapted to be opened and closed by said valve, an open feed pipe leading from said chamber, and a series of pressure service pipes of varying pressures that discharge directly into said main chamber, the port of but one of which is closed when said exhaust pipe is open, the discharge from the other ports being controlled by an individual valve within the same, and the ports of all of said service pipes adapted to be opened when said exhaust pipe is closed.

7. An automatic pressure controlling valve comprising a sliding valve, the central portion of which is reduced in diameter, a suitable casing therefor, an exhaust-pipe at one end of said casing, a feed-pipe leading from the portion of the casing traversed by the reduced part of said valve, a series of service-pipes of varying pressures, the inlet port of the low pressure pipe being closed by said valve when the exhaust is open, and vice versa, and the inlet ports of the remaining pipes being always open to said casing.

8. An automatic pressure controlling valve comprising a sliding valve, the central portion of which is reduced in diameter, a suitable casing therefor, a feed-pipe leading from the portion of the casing traversed by the reduced part of said valve, a series of valve-controlled service-pipes of varying pressures, the inlet port of the low pressure pipe being closed by said valve when the exhaust is opened, and vice versa, and the inlet ports of the remaining pipes being always open to said casing.

9. An automatic pressure controlling valve comprising a sliding valve, the central portion of which is reduced in diameter, a suitable casing therefor, a feed pipe leading from the portion of the casing traversed by the reduced part of said valve, a series of service-pipes of varying pressures, the inlet port of the low pressure pipe being closed by said valve when the exhaust is open, and vice versa, and the inlet ports of the remaining pipes being always open to said casing, and valves in said service-pipes which, after the low pressure service-pipe is opened, are consecutively opened by the pressure from the pipe next in pressure below it when the resistance to the latter is greater than its pressure.

10. In an automatic pressure controlling valve, a master-valve, a suitable casing having a main chamber within which said master valve reciprocates, an exhaust pipe leading from one end of said chamber, a low pressure service-pipe, discharging directly into the opposite end of said chamber and adapted to be alternately opened and closed by said valve, service-pipes of varying pressure greater than said low pressure pipe, the discharge ports of which are always open to the valve-chamber, valve mechanism in said greater pressure pipes, the area of the surface of said valve mechanism exposed to the pressure from the master-valve chamber being greater than that exposed to the pressure of the service-pipes.

11. In an automatic pressure controlling valve, a master valve, a suitable casing having a main chamber within which said master valve reciprocates, an exhaust pipe leading from one end of said chamber, a low pressure pipe discharging directly into the opposite end of said chamber and adapted to be alternately opened and closed by said valve, service-pipes of varying pressures greater than said low pressure pipe the discharge ports of which are always open to the chamber of the aforesaid valve, valve mechanism in said greater pressure pipes, and springs for closing said valve-mechanism.

12. In an automatic pressure controlling valve, a valve, a suitable casing having a main chamber within which said valve reciprocates, an exhaust pipe leading from one end of said chamber, a low pressure pipe discharging directly into the opposite end of said chamber and adapted to be alternately opened and closed by said valve, service-pipes of varying pressures greater than said low pressure pipe the discharge ports of which are always open to the chamber of the aforesaid valve, valves in said greater pressure pipes having spindles extending out of the casing containing the same, coiled springs engaging the same, and gage-screws therefor.

13. In an automatic pressure controlling valve, a valve, a suitable casing having a main chamber within which said valve reciprocates, an exhaust pipe leading from one end of said chamber, a low pressure service-pipe, discharging directly into the opposite end of said chamber and adapted to be alternately opened and closed by said valve, service-pipes of varying pressure greater than said low pressure pipe, the discharge ports of which are always open to the valve-chamber, valves in said greater pressure-pipes, automatically returnable valves for regulating the resistance thereof to the pressure in said chamber, hollow pistons having one end bearing against the heads of said valves and having openings therein, and piston-heads for said pistons.

14. In an automatic pressure controlling valve, a valve, a low pressure pipe adapted to be alternately opened and closed by said valve, service-pipes of varying pressures greater than said low pressure pipe, the discharge ports of which are always open to the chamber of the aforesaid valve, valves in said greater pressure pipes having spindles extending out of the casing containing the same, springs engaging the same, hollow pistons having one end bearing against the heads of said valves and having openings therein, and piston-heads for said pistons.

15. In an automatic pressure controlling valve, a master-valve, a low pressure service-pipe, adapted to be alternately opened and closed by said valve, service-pipes of varying pressure greater than said low pressure pipe, the discharge ports of which are always open to the valve-chamber, valve mechanism in said greater pressure pipes comprising an automatically returnable valve, the exposed head of which regulates the resistance to the pressure in said chamber, a hollow piston having one end provided with lateral openings and bearing against the heads of said valves, a puppet valve for the opposite end of said piston, and piston-heads for the same.

16. In an automatic pressure controlling valve, a valve, a low pressure pipe adapted to be alternately opened and closed by said valve, service-pipes of varying pressure greater than said low pressure pipe, the discharge ports of which are always open to the chamber of the aforesaid valve, valves in said greater pressure pipes having spindles extending out of the casing containing the same, springs, means regulating the pressure thereof against said spindle, a hollow piston having one end provided with lateral openings and bearing against the heads of said valves, puppet valves in the opposite ends of said pistons, and piston-heads for said pistons.

17. In an automatic pressure controlling valve, a sliding valve, a suitable casing having a main chamber within which said valve reciprocates, an exhaust pipe leading from one end of said chamber, a low pressure service-pipe, discharging directly into the opposite end of said chamber and the discharge port of which is adapted to be alternately opened and closed by said valve, valve controlled service-pipes of varying pressures greater than said low pressure pipe, the discharge ports of which are always open to the chamber of the aforesaid valve, a combined valve-seat and cage, and a valve confined therein, which valve-seat and valve are inclosed within the discharge chamber of said low pressure service-pipe.

18. In an automatic pressure controlling valve, a sliding valve, a suitable casing having a main chamber within which said valve reciprocates, an exhaust pipe leading from one end of said chamber, a low-pressure service-pipe, discharging directly into the opposite end of said chamber and the discharge port of which is adapted to be alternately opened and closed by said valve, valve controlled service-pipes of varying pressures greater than said low-pressure pipe, the discharge ports of which are always open to the chamber of the aforesaid valve, a combined valve-seat and cage having perforated sides, and a valve confined therein, which valve-seat and valve are inclosed within the discharge chamber of said low pressure service-pipe.

19. In an automatic pressure controlling valve, a sliding valve, a suitable casing having a main chamber within which said valve reciprocates, an exhaust pipe leading from one end of said chamber, a low-pressure service-pipe, discharging directly into the opposite end of said chamber and the discharge port of which is adapted to be alternately opened and closed by said valve, valve controlled service-pipes of varying pressures greater than said low-pressure pipe, the discharge-ports of which are always open to the chamber of the aforesaid valve, a combined valve-seat and cage, a valve and spring for holding it on its seat confined therein, which valve-seat and valve are inclosed within the discharge chamber of said low pressure service-pipe.

20. In an automatic pressure controlling valve, a sliding valve, a suitable casing having a main chamber within which said valve reciprocates, an exhaust pipe leading from one end of said chamber, a low pressure service pipe discharging directly into the opposite end of said chamber and the discharge port of which is adapted to be alternately closed and opened by said sliding valve, independent valve-controlled service pipes of varying pressures greater than said low pressure pipe, the discharge ports of which are always open to the chamber of the sliding valve, a cage in the valve chamber of said low pressure pipe, a plate closing the upper end thereof, a low pressure valve, and a spring within said cage interposed between said low pressure valve and said plate.

21. An automatic pressure controlling valve comprising a sliding valve, the central portion of which is reduced in diameter, a suitable casing therefor, an exhaust-pipe at one end of said casing, a feed-pipe leading from the portion of the casing traversed by the reduced part of said valve, a series of service-pipes of varying pressures, the inlet port of the low-pressure pipe being closed by said valve when the exhaust is open, and vice versa, and the inlet ports of the remaining pipes being always open to said casing, and a piston and cylinder therefor for sliding said valve.

22. In an automatic pressure controlling valve, a sliding valve, a low-pressure service-pipe, the discharge port of which is adapted to be alternately opened and closed by said valve, valve controlled service-pipes of varying pressures greater than said low-pressure pipe, the discharge ports of which are always open to the chamber of the aforesaid valve, means for regulating the resistance thereof to the pressure in the chamber of the aforesaid valve, a combined valve-seat and cage, and a valve confined therein, which valve-seat and valve are inclosed within the discharge chamber of said low-pressure service-pipe.

23. In an automatic pressure controlling valve, a sliding valve, a low-pressure service-pipe, the discharge port of which is adapted to be alternately opened and closed by said valve, valve-controlled service-pipes of varying pressures greater than said low-pressure pipe, the discharge ports of which are always open to the chamber of the aforesaid valve, valves in said greater pressure pipes having spindles extending out of the casing containing the same, springs, and means for regulating the pressure thereof against said spindles, a combined valve-seat and cage, and a valve confined therein, which valve-seat and valve are inclosed within the discharge chamber of said low pressure service-pipe.

24. An automatic pressure controlling valve, comprising a single longitudinally reciprocable valve and a casing therefor having a main chamber within which said valve reciprocates, an exhaust pipe leading from said chamber and adapted to be opened and closed by said valve, an open feed pipe leading from said chamber, a series of separate pressure service pipes adapted to discharge directly into said chamber, separate valves for said pipes that are automatically opened successively by the pressure from the preceding pressure service pipe, and a piston and cylinder therefor for sliding said valve.

In witness whereof I have hereunto set my hand this 24th day of December 1909.

WILLIAM P. BETTENDORF.

Witnesses:
A. B. FRENIER,
A. K. READING.